(12) United States Patent
Abrahao et al.

(10) Patent No.: US 7,698,111 B2
(45) Date of Patent: Apr. 13, 2010

(54) METHOD AND APPARATUS FOR COMPUTATIONAL ANALYSIS

(75) Inventors: Bruno Abrahao, Minas Gerais (BR); Alex X. Zhang, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1301 days.

(21) Appl. No.: 11/076,131

(22) Filed: Mar. 9, 2005

(65) Prior Publication Data

US 2006/0224531 A1    Oct. 5, 2006

(51) Int. Cl.
*G06F 7/60* (2006.01)
*G06F 15/173* (2006.01)

(52) U.S. Cl. .................................. 703/2; 709/224
(58) Field of Classification Search .............. 703/2; 709/224
See application file for complete search history.

(56) References Cited

U.S. PATENT DOCUMENTS

| | | | |
|---|---|---|---|
| 6,877,035 B2 * | 4/2005 | Shahabuddin et al. | 709/226 |
| 6,973,622 B1 * | 12/2005 | Rappaport et al. | 715/735 |
| 7,219,086 B2 * | 5/2007 | Geshwind et al. | 706/20 |
| 7,251,037 B2 * | 7/2007 | Jones | 356/454 |
| 7,389,203 B2 * | 6/2008 | Tanaka | 702/185 |
| 7,577,538 B2 * | 8/2009 | Wang | 702/85 |
| 2005/0240544 A1 * | 10/2005 | Kil et al. | 706/45 |

OTHER PUBLICATIONS

A. Lakhina et al., "Structural Analysis of Network Traffic Flows," ACM Sigmetrics/Performance, Jun. 12-16, 2004, 12 pp.
J. Rolia et al., Statistical Service Assurances for Appliances in Utility Grid Environments, Hewlett-Packard Laboratories, Jun. 13, 2002, HPL-2002-155, 22 pp.
J. Rolia et al., "Automating Enterprise Application Placement in Resource Utilities," Self-Managing Distributed Systems: 14th IFIP/IEEE International Workshop on Distributed Systems: Operations and Management, DSOM 2003, vol. 2867/2004, Jan. 2004, pp. 118-129.
D. Thiebaut, "On the Fractal Dimension of Computer Programs and its Application to the Prediction of the Cache Miss Ratio," IEEE Transactions on Computers, vol. 38, Issue 7, Jul. 1989, pp. 1012-1026.

* cited by examiner

*Primary Examiner*—Paul L Rodriguez
*Assistant Examiner*—Juan C Ochoa

(57) ABSTRACT

A method for computational analysis includes collecting an application dataset and extracting one or more features from the application dataset in order to generate a utilization workload model. The features correspond to an intrinsic dimensionality of the dataset. An apparatus and a computer-usable medium storing instructions executable by a processor for providing the computational analysis is also described.

16 Claims, 13 Drawing Sheets

METHOD AND APPARATUS FOR COMPUTATIONAL ANALYSIS

BACKGROUND

A concern for many business enterprises is proper utilization of computational resources. In a fast changing business environment, an enterprise can go from having too much computational capacity to having too little in a short period of time. Having too much computational capacity causes a business enterprise to waste resources, while having too little capacity can cause a business enterprise to lose potential business opportunities.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
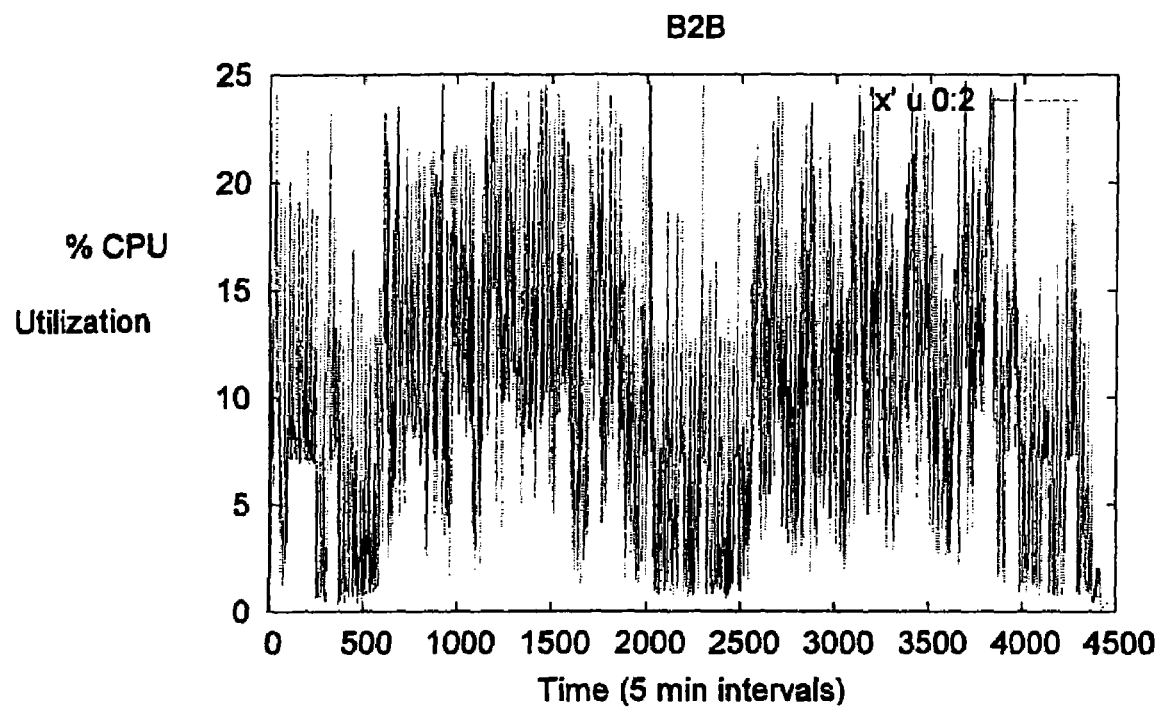
FIG. 1 shows an application trace for a first application in accordance with an embodiment of the invention.

Certain term(s) are used throughout the following description and claims to refer to particular system components. As one skilled in the art will appreciate, different companies/industries may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In a single system there may be hundreds or thousands of applications running simultaneously. If one had to analyze each application at a time, it would be a rather exhaustive task. Furthermore, the whole system's performance is affected not only by the behavior of each single application, but also by the resulting execution of several different applications combined together. This means that the system's overall performance is given by the superposition of several time-series that, in some instances, are not independent. A wide range of important problems require analysis of the entire system, including resource assignment, queuing networks and system behavior analysis. Since a single application analysis is itself a complex task, modeling the whole system behavior is even more difficult. The reason is that, considering each application as a time-series, forms a high dimensional structure.

In accordance with various embodiments of the invention, methods and apparatuses are described that provide for computational analysis including computational utilization analysis and reporting. The computational analysis can be performed on a single stand-alone computer or a computer system having one or more computers coupled directly or indirectly via a computer network. In order to characterize the workload of applications in a shared utility computing environment, Principal Component Analysis (PCA) is applied to a central process unit (CPU) utilization dataset. This dataset can be extracted from a server or other computational device. A workload model which is also referred to as a utilization workload model is generated using a small number of features that are derived from classification of applications based on some of their predominant feature(s).

In other embodiments of the invention, computational analysis, includes but is not limited to, classifying applications based on one or more features, detrending applications by removing one or more features or features from computer traces in order to focus on specific trends caused by one or more features, characterizing application workloads and generating synthetic workloads in order to analyze the effect of a new application. The computational analysis is also not limited to CPU utilization, but can also be applied to any computer hardware/software data, such as memory usage, disk usage, device input/output and network bandwidth data to name a few.

Central to issues regarding capacity analysis/planning is the understanding and prediction of resource usage characteristics or behaviors of the applications being executed in a computational system. For example, applications that exhibit "spiky" CPU usage may require higher CPU utilization allocation to meet a defined service level objective (SLO) given the applications' unpredictable nature, as compared to more predictable applications that have stable usage patterns.

In one embodiment, PCA along with other analysis techniques such as structural analysis are applied to an application dataset (includes data from one or more applications) from a computational system such as a server. Based on this analysis, it is possible to generate a workload model that is described by a small set of features that can be further classified by their resemblance to stochastic process characteristics, such as "periodic," "noisy" or "spiky." The number of features used for classification of applications can depend on the particular design requirements. The features are then used for several purposes, including classifying applications based on their behavioral features, de-trending application traces, generating a synthetic workload with the ability to add to or suppress any of the features, etc. The application dataset collected can include CPU utilization data, memory usage data, disk usage data, device I/O data, network bandwidth usage data or any computer hardware data that needs to be analyzed.

The input to the analysis includes average CPU utilization by each application program for a predefined interval of time (e.g., 10 minutes, etc.). Each application program's CPU utilization data is referred to as a "trace" and may comprise a time-series including numerous data points for each time interval. The interval of time selected for the analysis can depend on the type of applications and their behavior pattern that operate in a given system. For example, very spiky applications that require a lot of computational capability over a very short period of time may require the use of short time intervals in order to perform a proper analysis.

Some applications running in a computational system share common behaviors over time. For example, several applications can share the same periodic behavior, such as applications that are utilized during business hours. Some applications can present fairly simultaneous short bursts or spikes of high demand typically triggered by special events that occur during certain periods. These observations of system behavior allows for a complex computational system running a number of applications to be governed by a small set of features and therefore be represented by a lower-dimensional representation in accordance with some embodiments of the invention. Features can include correlated periodicity, simultaneous demand spikes, etc.

Singular values account for data variability along corresponding principal components. Extracting these singular values using PCA or another feature selection technique it can be determined which features bring information into a dataset. There are some components that account for low variability and therefore have low representation in the dataset. The minimum number of features needed to closely approximate a high-dimensional structure, is referred to as the intrinsic dimensionality of the data. Using PCA, a large amount of data can be processed quickly to determine whether the whole system has low intrinsic dimensionality, and to identify the prominent features exhibited in the data. PCA is a useful technique for feature selection. A large amount of data can be processed quickly to determine whether a system has low intrinsic dimensionality using PCA. PCA also helps identify the prominent features exhibited in the data, thus making it possible, by exploiting common temporal patterns shared by applications, to generate a workload model that is described by a small set of features.

In a computational system such as a Hewlett Packard RP8400 production server using HP-UX™ operating system and an HP Open View Performance Agent™ (OVPA) that is used to collect performance data from the system, the OVPA aggregates the server's CPU utilization at predetermined intervals and writes to a log file which subsequently is extracted and stored. In Table 1 there is shown an illustrative embodiment in which CPU utilization information was collected for the above system over a two-week period. During the two-week collection period, CPU utilization percentages were collected during 5-minute intervals. Table 1 shows the maximum, the average and the standard deviation of the percentage of CPU utilization during the two-week period. The number in the first column is used as a further reference to the applications. From Table 1, it is possible to conclude that the server is still under light utilization.

TABLE 1

| Num. | Application | Max | Avg | Std. Dev. |
|---|---|---|---|---|
| 01 | ARC | 14.31 | 0.08 | 0.04 |
| 02 | B2B | 24.79 | 9.59 | 5.64 |
| 03 | Contivo | 0.34 | 0.02 | 0.01 |
| 04 | Esgui | 0.38 | 0.22 | 0.03 |
| 05 | Parallax | 0.11 | 0.04 | 0.01 |
| 06 | Primavision | 3.14 | 0.19 | 0.25 |
| 07 | Psghrms | 9.49 | 1.08 | 1.21 |
| 08 | Pshd | 5.12 | 0.54 | 0.63 |
| 09 | Psportal | 18.56 | 0.97 | 1.65 |
| 10 | Rdma | 0.09 | 0.00 | 0.01 |
| 11 | Rocket | 0.60 | 0.01 | 0.02 |
| 12 | Wwtb | 10.37 | 0.01 | 0.01 |

From the data collected, a CPU utilization measurement is generated. This measurement can take the form of an "m×p" matrix X, where the number of rows, m, represent the number of time intervals (e.g., number of 5-minute intervals during a two-week period) and the number of columns, p, are the number of applications (e.g., p=12) in the system (note that m>>p.)

Figure 2:
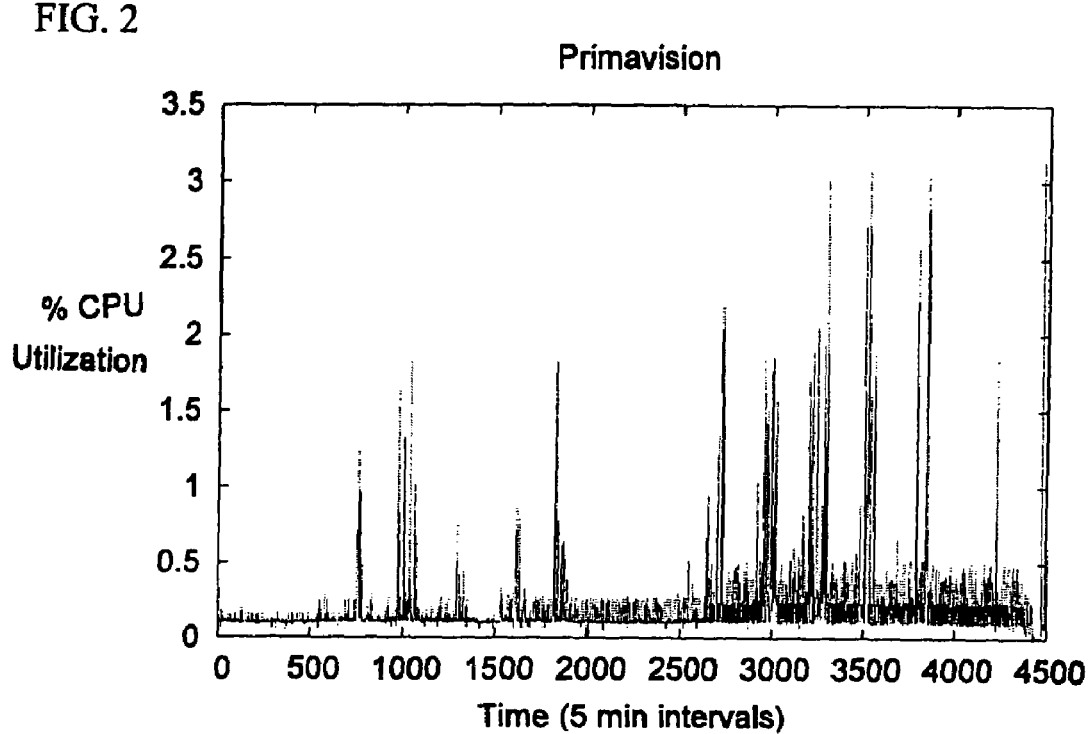
FIG. 2 shows an application trace for a second application in accordance with an embodiment of the invention.
Figure 3:
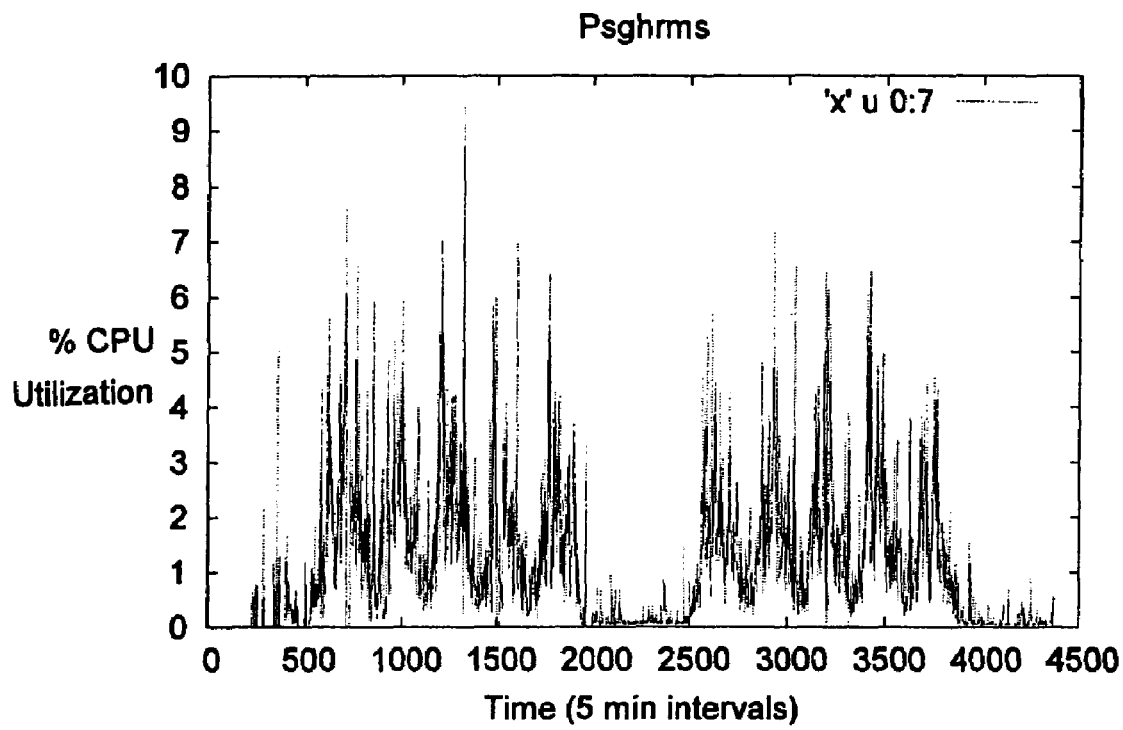
FIG. 3 shows an application trace for a third application in accordance with an embodiment of the invention.

Each column "i" of the matrix represents an application time-series, referenced by a vector $X_i$, and each row represents an instance of all the applications at time t. The matrix X is used as an input for PCA. FIGS. 1-3 show some examples of application load traces. The plot shows the percentage of CPU utilization as a function of time. FIG. 1 shows the utilization for application 2, FIG. 2 shows the utilization for application 6 and FIG. 3 shows the utilization for application 7 from Table 1. The application traces shown in FIGS. 1-3 show some temporal patterns during the course of the two week study period.

Figure 4:
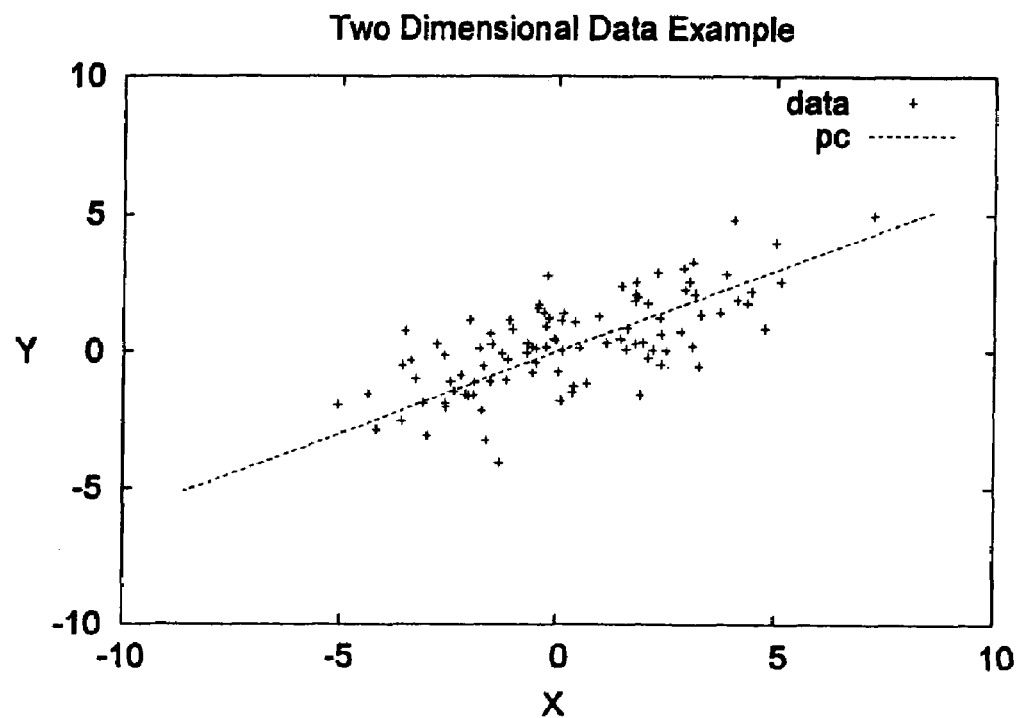
FIG. 4 shows a graph illustrating how a principal component is found in accordance with an embodiment of the invention.

PCA can place data into a new set of components or coordinates with the property that the first or principal component points to the maximum data variation magnitude, in terms of a Euclidean norm. After the first component is found, the second orthogonal component is found by removing the information captured by the first component and capturing the maximum variation of the residual, and so forth. This is illustrated graphically using a two-dimensional space. In FIG. 4 there is a group of data being fitted to a principal component along the direction that captures the maximum variation in magnitude from the data. This is equivalent to finding the eigen-vectors of $X^TX$, $X^T = Xv_i = \lambda_i v_i$ where i=1, . . . , p. The eigen-values, $\lambda_i$, provide the magnitude of the variation along each component i. Because $X^TX$ is symmetric and positive definite, its eigen values are non-negative. The eigen-vectors, $\lambda_i$, are vectors of size p and they form the transformation matrix V. To maintain consistency, the vectors, $v_i$, are rearranged according to their corresponding $\lambda_i$ values in decreasing order.

In the new mapped space, the contribution of principal component i is given by $u_i = Xv_i$. The $u_i$ vector of size m is actually a feature shared by all applications along the principal component i. It can be normalized to unit length by dividing by the singular value $\sigma_i = \sqrt{\lambda_i}$. Since the V matrix is sorted in a way in which the first component represents the maximum variation in energy, $u_1$ is the most dominant feature, $u_2$ is the second most dominant feature, etc.

Conversely, the original data can be reconstructed from features as:

$$X = U(V^{-1}). \tag{1}$$

where U is the m×p feature matrix and V is a p×p matrix containing the eigen-vectors.

In accordance with an embodiment of the invention, in order to examine the low intrinsic dimensionality of the application set presented in the above example, PCA is applied to the dataset. The singular values account for the data variability along their correspondent principal components. Extracting the singular values using PCA, it can be determined how many features actually bring information to the dataset. In other words, some components account for low variability and therefore have low degrees of representation in the dataset.

There are two possible causes for the low intrinsic dimensionality. First, if the magnitude of the loads differs greatly among the applications, the ones that have the greatest mean values will dominate the energy (or variance) in the dataset. Second, the other cause of low intrinsic dimensionality can be attributed to the common patterns among the time series, making the dimensions correlated and, therefore, redundant.

To avoid the first effect discussed above, the time series data is normalized to zero mean and unit variance as follows:

$$X_{i,t} = \frac{X_{i,t} - \overline{X}_{i,*}}{\sigma_i}. \tag{2}$$

Figure 5:
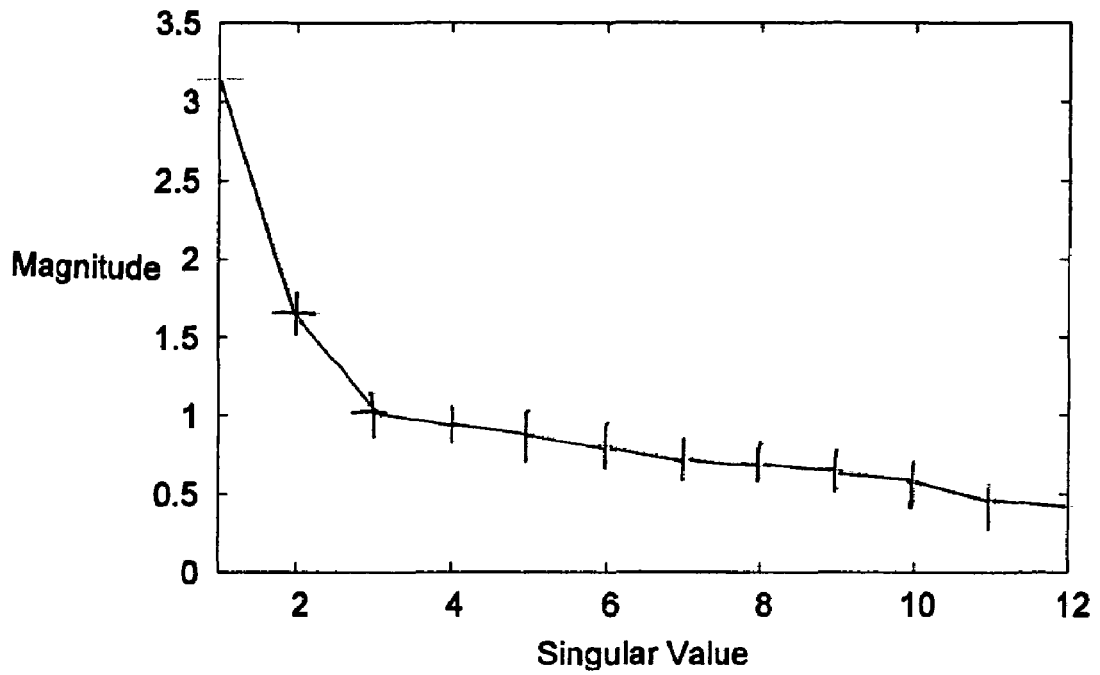
FIG. 5 shows a scree plot in accordance with an embodiment of the invention.

A scree plot as shown in FIG. 5 can be used to carry out the dimensionality analysis. In the plot, the singular values are plotted against their magnitude. As shown in the example of FIG. 5, while features 1 and 2 account for a change of two points in magnitude, the other ten features together account only for one. If for example the first three attributes are considered to reconstruct the original trace, it is possible that the reconstruction will preserve the main characteristics of the original, even though the process will incur some loss or distortion.

Figure 6:
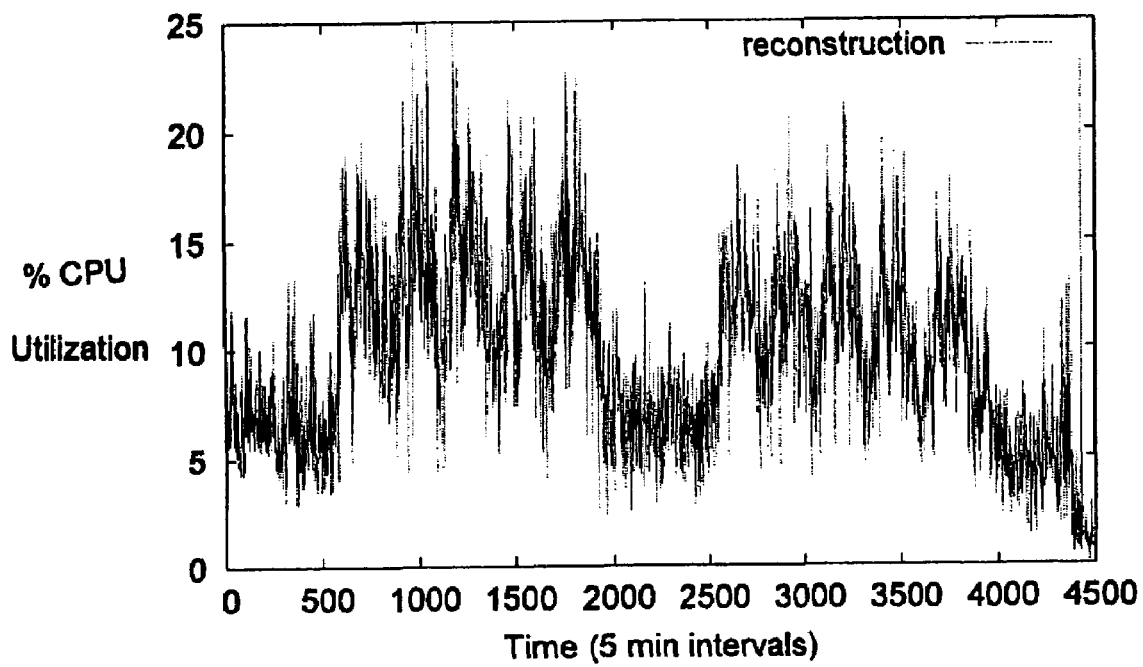
FIG. 6 shows a graph of a reconstructed trace for the trace shown in FIG. 1 in accordance with an embodiment of the invention.
Figure 7:
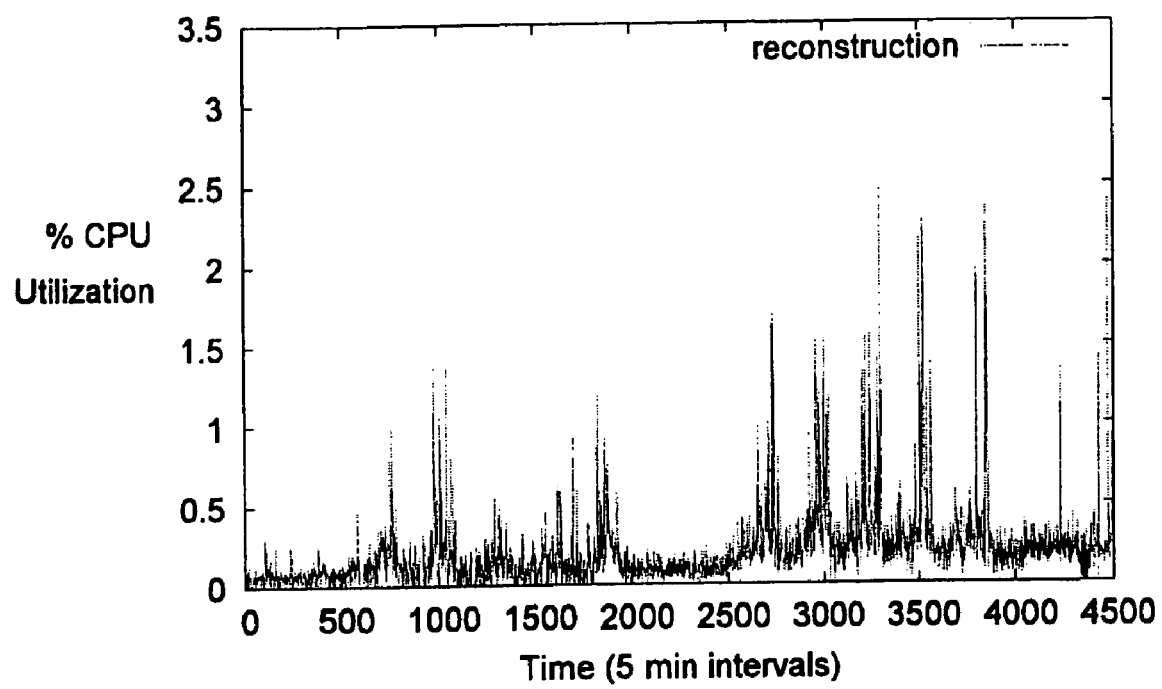
FIG. 7 shows a graph of a reconstructed trace of the trace shown in FIG. 2 in accordance with an embodiment of the invention.
Figure 8:
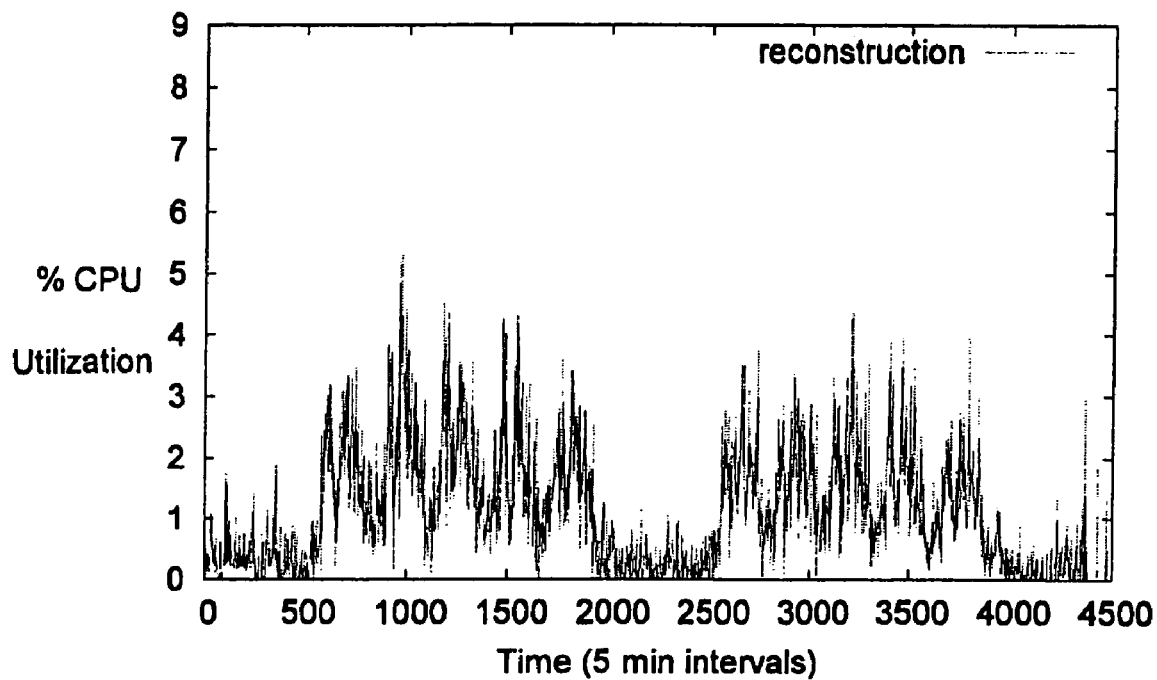
FIG. 8 shows a graph of a reconstructed trace of the trace shown in FIG. 3 in accordance with an embodiment of the invention.

Referring now to FIGS. 6-8, there is shown the reconstructed traces of applications presented in FIGS. 1-3, using only three out of twelve features. As shown in FIGS. 6-8, the temporal patterns of the applications shown in FIGS. 1-3 are preserved respectively in FIGS. 6-8. The number of features that are selected to generate the reconstructed traces depends on the error tolerance level that can be tolerated for the particular system being evaluated.

Figure 9:
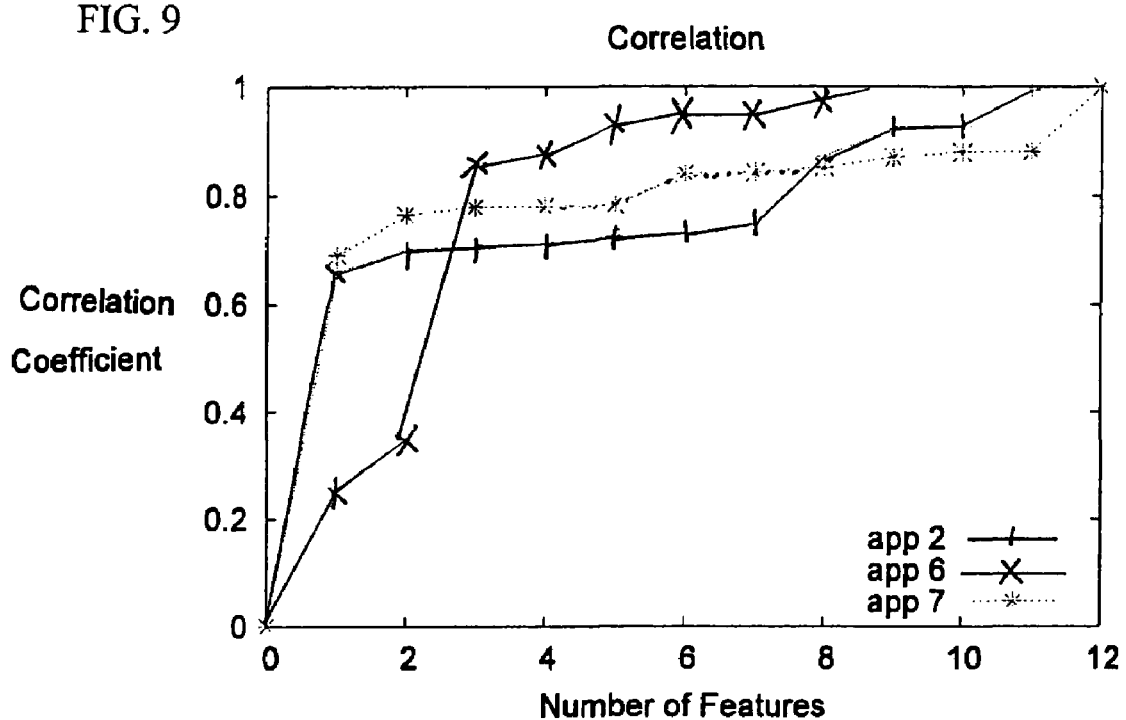
FIG. 9 shows a graph of the correlation coefficient between an actual trace and the reconstructed trace, as a function of the number of features chosen, for three applications in accordance with an embodiment of the invention.

Correlation between a reconstructed trace and original trace can be plotted in order to determine which features have the greatest impact on the correlation coefficient. An illustrative plot of features selected for the reconstructed trace of different applications versus correlation coefficient is shown in FIG. 9. In the example shown in FIG. 9, the first feature has a significant effect on the correlation while features two and three further add to the correlation. Since three features were able to capture the temporal characteristics of the original traces, in the example of FIG. 9 three is considered the intrinsic dimensionality of the data. In other examples, the number of features that are considered the intrinsic dimensionality will depend on the particular system characteristics.

Figure 10:
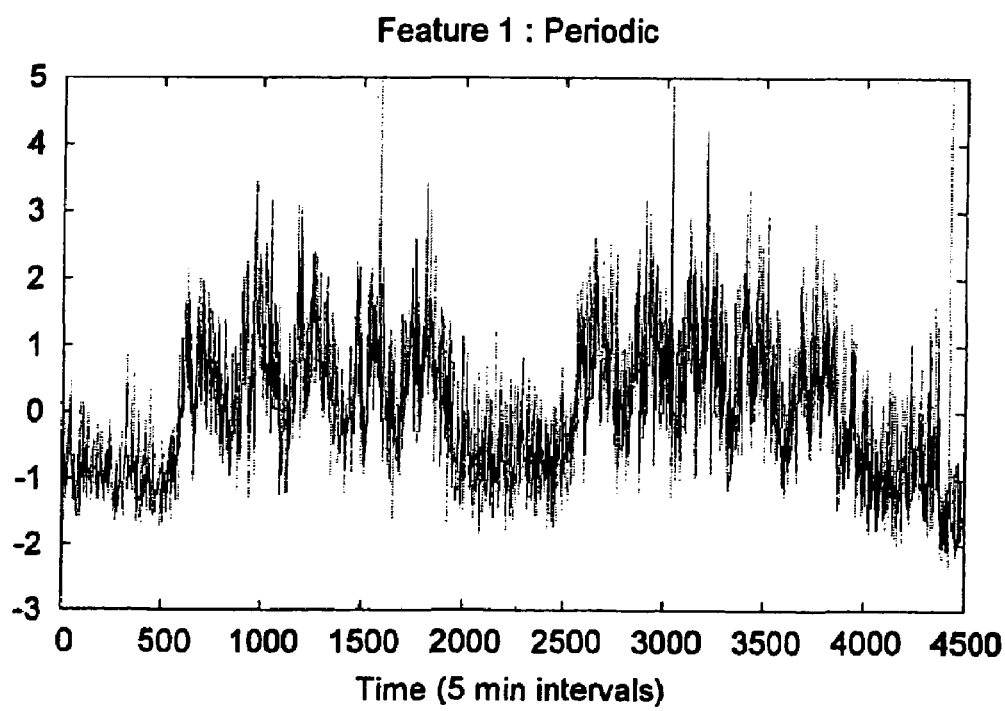
FIG. 10 shows a graph of a first feature in accordance with an embodiment of the invention.
Figure 11:
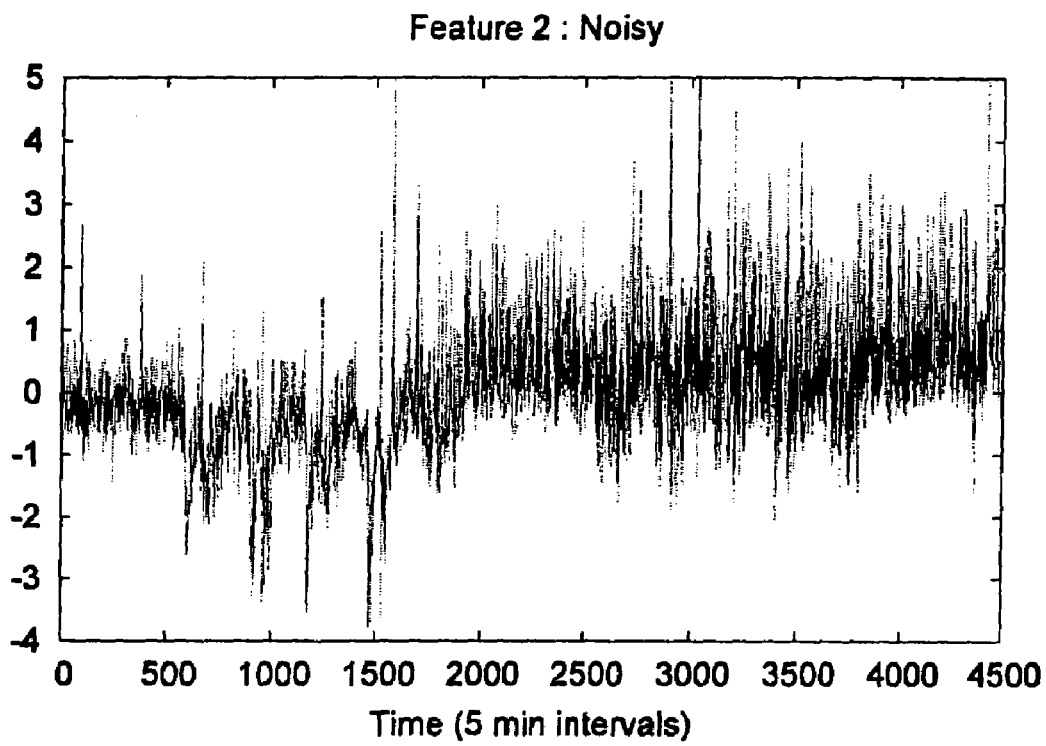
FIG. 11 shows a graph of a second feature in accordance with an embodiment of the invention.
Figure 12:
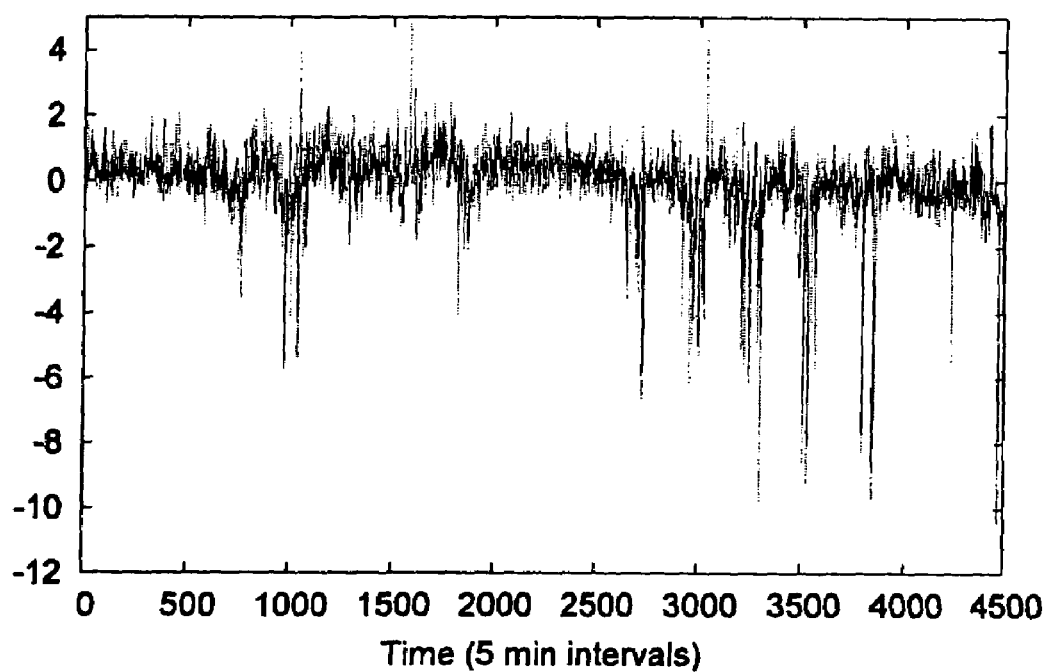
FIG. 12 shows a graph of a third feature in accordance with an embodiment of the invention.

The three most dominant features are displayed in FIGS. 10-12. The first feature shown in FIG. 10 has a periodic trend having a period of a complete business day (e.g., 288 intervals of five minutes). Given the periodic nature of this feature, the feature is referred to as "periodic." The longer valleys show in FIG. 10 is attributed to weekends, when the activity drops.

In FIG. 11, there is shown the second feature, which in this case resembles noise such as Gaussian noise, so the feature is referred to as "noisy." The third feature is shown in FIG. 12. The feature displays spikes in each business day, with some intensification during the second week due to increased application use activity. Given the regular peaks of activity, this third feature is referred to as "spiky."

Figure 22:
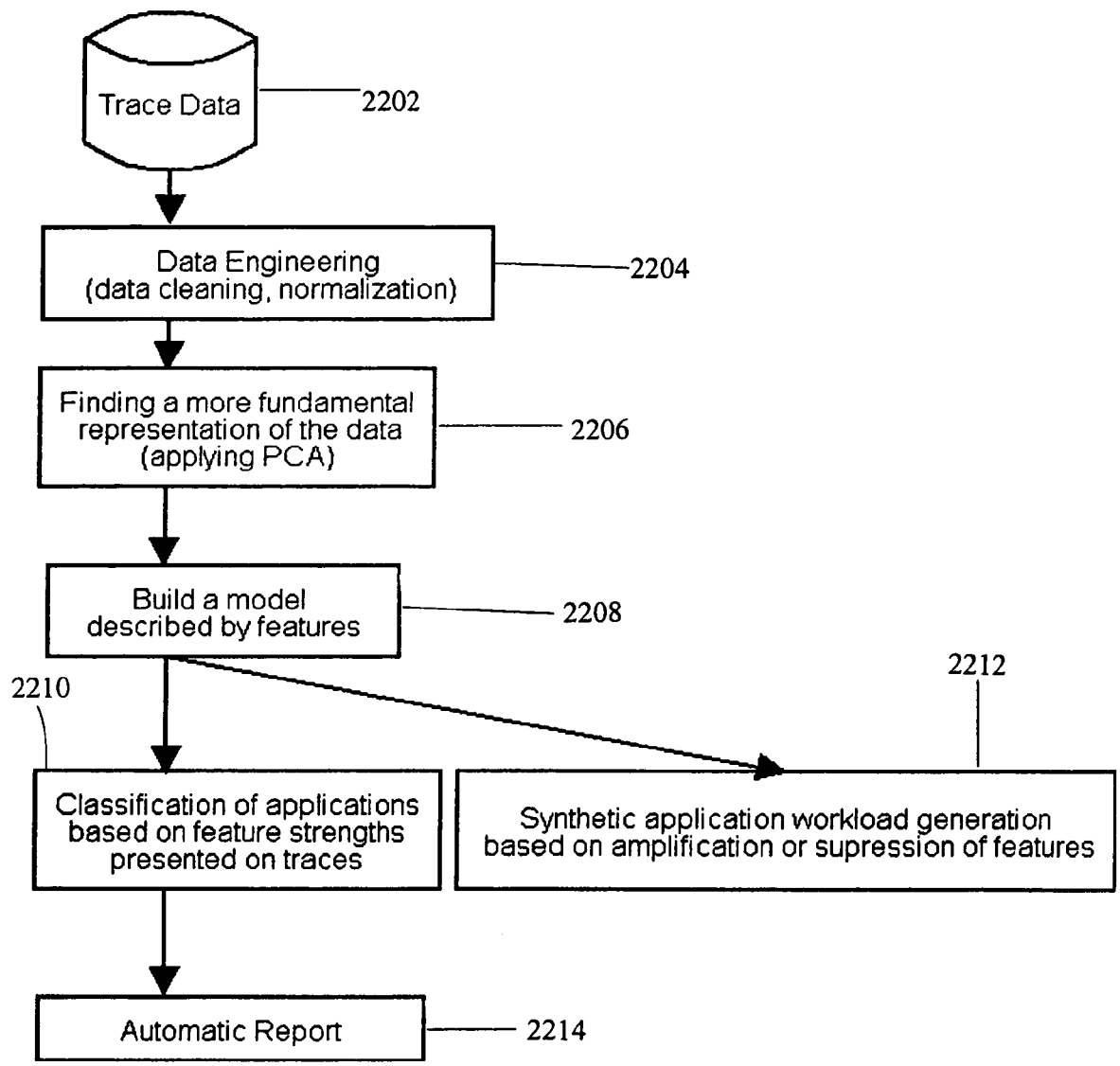
FIG. 22 shows a flowchart in accordance with an embodiment of the invention.

Referring now to FIG. 22, there is shown a flow chart highlighting some of the actions taken when performing capacity management in accordance with one embodiment of the invention. In 2202, trace data that had been collected is cleaned and normalized in 2204. At 2206, a more fundamental representation of the data is found. For example, PCA may be applied to the data in 2206 in order to simplify the representation of the data. In 2208, a model can then be built using the feature descriptions. Some of the uses of the utilization workload model can include classifying applications based on feature strengths presented on traces as in 2210. The model of 2208 can also be used to generate a synthetic application workload based on amplification or suppression of certain features in the model as in 2212. Some of these different uses for the utilization workload model of 2208 are discussed in more detail further below. Finally, in 2214 an automatic report is generated. This report can take many forms depending on the particular requirements for the information. For example, the report can show how each of the applications operating in a system would be classified for a period of time (e.g., periodic, spiky, noisy or a combination of some of these). Also, graphical representations of the application over time can also be shown, so a system operator can get a quick look at the temporal behavior of the applications.

Figure 23:
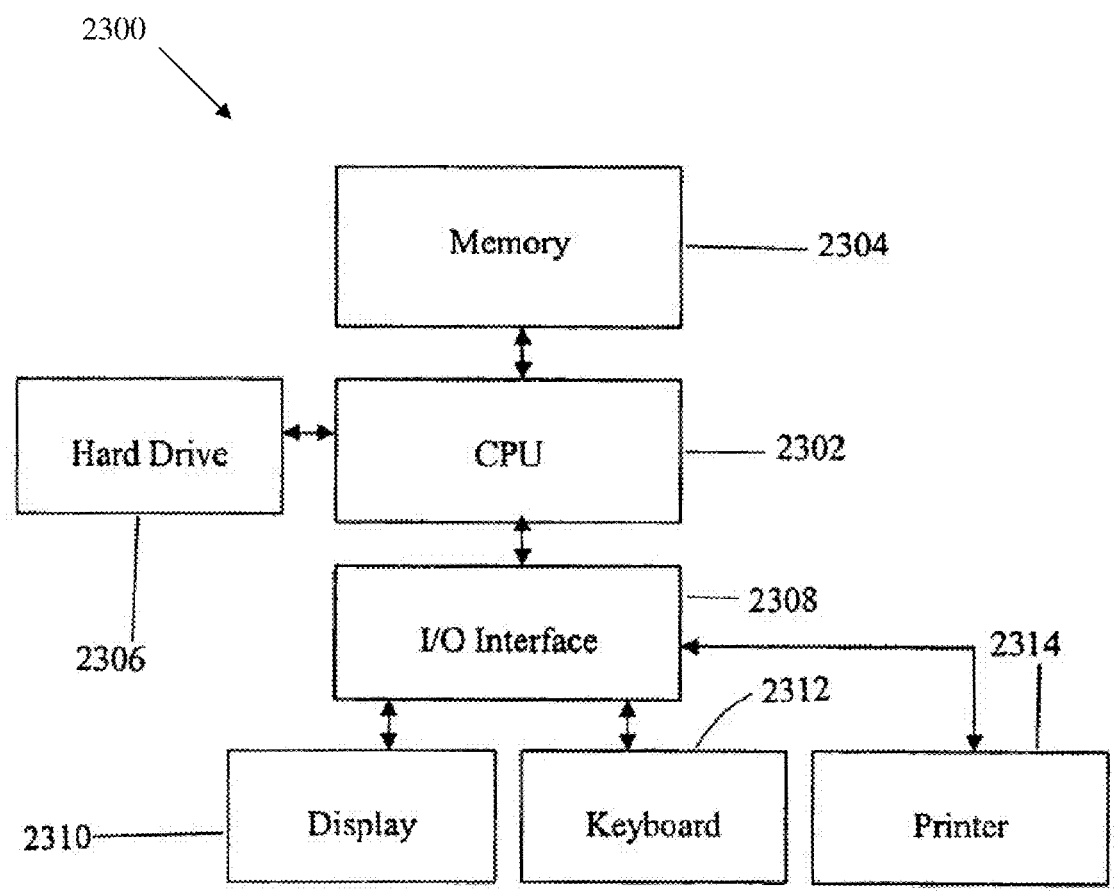
FIG. 23 shows a block diagram of a computational system in accordance with an embodiment of the invention.

In FIG. 23 there is shown a block diagram of a computational device such as a server 2300. A central processing unit (CPU) 2302 provides the overall control for server 2300. A hard drive 2306 stores programs such as the capacity management program of the present invention which are executed by CPU 2302. Memory 2304 such as random access memory (RAM), etc and an input/output (I/O) interface 2308 are also coupled to CPU 2302. The I/O interface 2308 has coupled to it a display 2310, keyboard 2312 and a printer 2314. The display 2310 and printer 2314 can be used to display to an operator the capacity management reports generated in accordance with embodiments of the invention.

The extracted features in accordance with embodiments of the invention can be used to describe a system's behavior, classify the applications in a system and analyze the applications components, and generate synthetic traces for test and simulation purposes. Although specific uses are discussed below, the extracted features can be used for other uses associated with capacity management.

Classifying Applications

Large numbers of applications can be classified quickly using just a few features using the classification technique of the present invention. By classifying the applications using the features, a computer system planner can distribute applications among computational resources (e.g., servers) in order to better balance out the resources and provide for better system performance.

Figure 13:
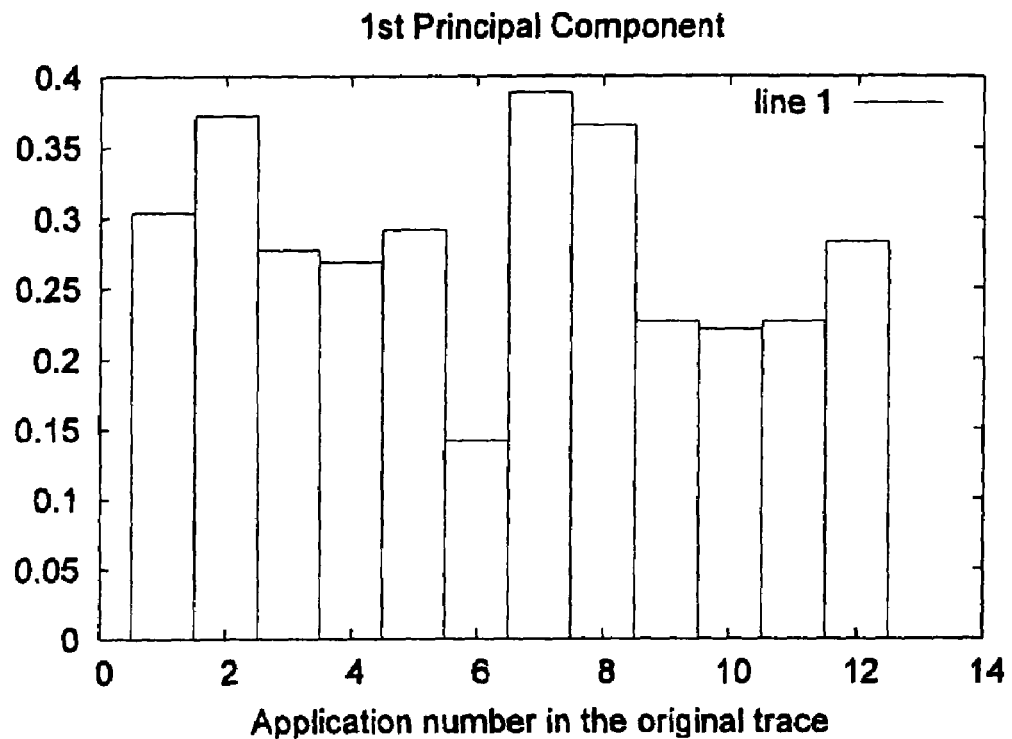
FIG. 13 shows a graph of the first component in several applications in accordance with an embodiment of the invention.
Figure 14:
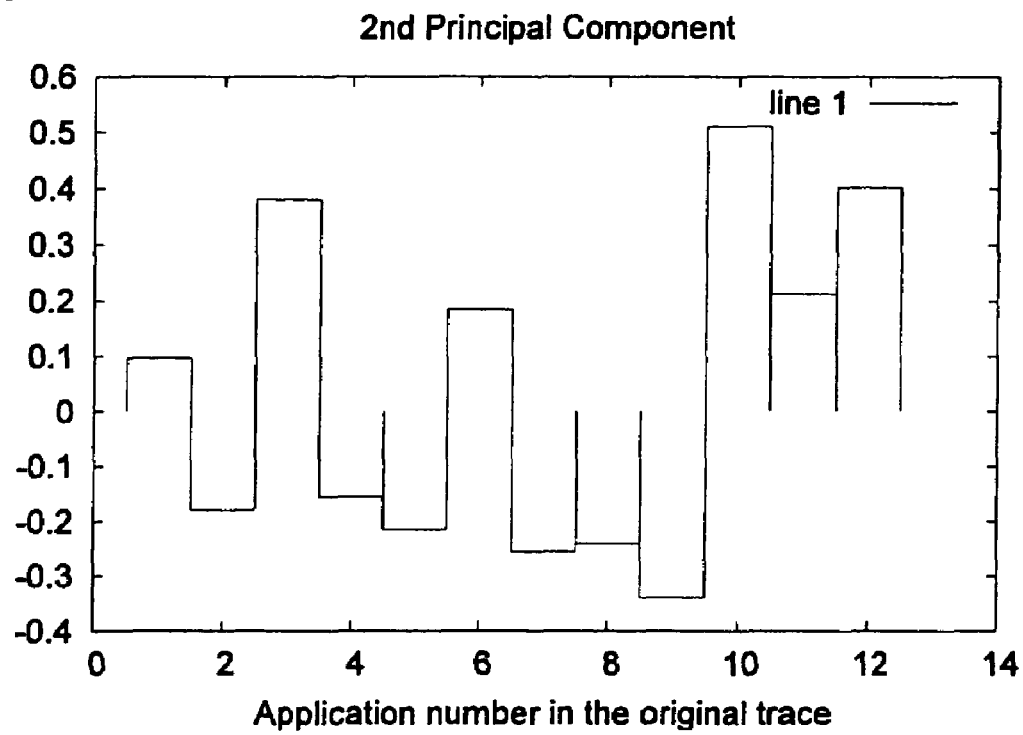
FIG. 14 shows a graph of the second component in several applications in accordance with an embodiment of the invention.
Figure 15:
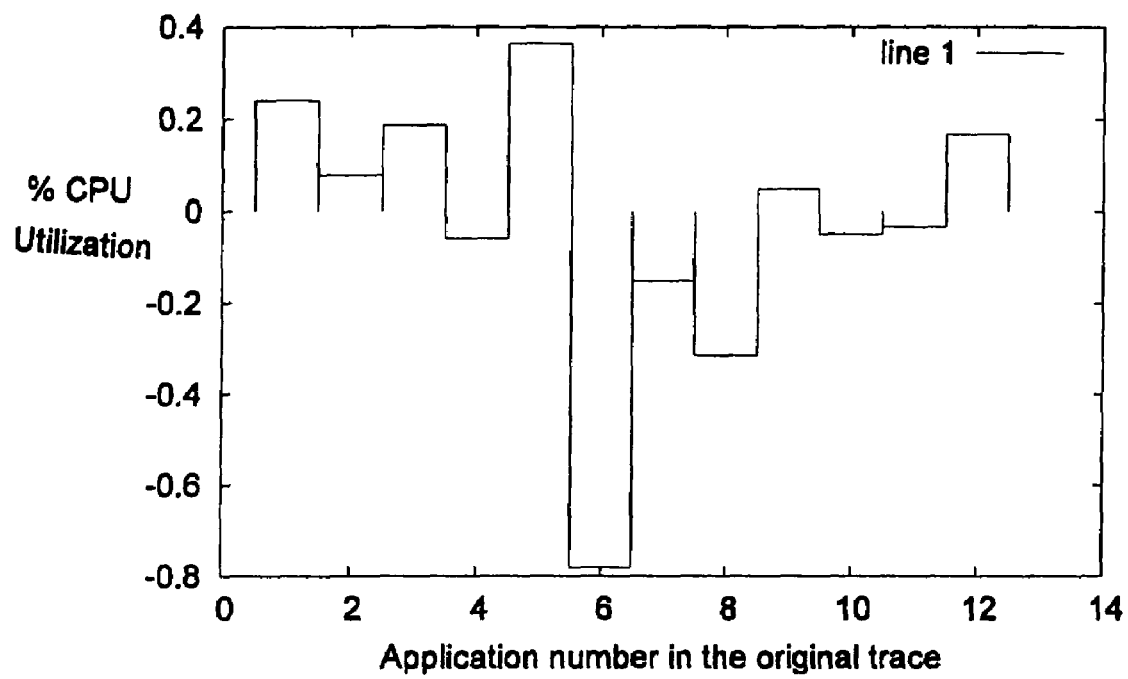
FIG. 15 shows a graph of the third component in several applications in accordance with an embodiment of the invention.

The features help collect the pattern of variation over time common to the set of original traces. The extent to which a particular pattern is presented on each application trace is given by the entries of $V_i$, the eigen-vectors. The graphs for the entries of the three dominant components are shown in FIGS. 13-15. The numbers in the x-axis correspond to the number of the application operating in the system. The greater the absolute number of the entry as shown by the y-axis, the stronger the corresponding feature is present in the original application load behavior. As an illustrative example, the third component in FIG. 15 which corresponds to the third or "spiky" feature, application number 6 has a very strong presence of this feature in its behavior. Application 6 is shown in FIG. 2. The strong spiky nature of the application can be confirmed by looking at the plot of the original trace. In the same fashion, applications 2 and 7 have the strongest presence of the periodic behavior, as shown in FIG. 13.

Using the above classification technique, applications can be classified according to one or more of their predominant features: periodic, noisy or spiky. In order to determine which traces belong to a particular class, traces are selected if their entry in the component is greater than the mean value of the absolute values of all entries. Using this criterion, all applications in the first component greater than 0.27 are considered periodic, those applications having entries greater than 0.26 in the second component are considered noisy, and the applications greater than 0.20 in the third component are considered spiky. In practice all traces do not have to be classified. Finding one or more of the predominant behaviors of the traces helps make important capacity planning decisions. The results of the classification are shown in Table 2 below.

TABLE 2

| Num. | App | f1 | f2 | f3 | Class |
|---|---|---|---|---|---|
| 1 | ARC | 0.30 | 0.09 | 0.24 | Periodic, Spiky |
| 2 | B2B | 0.37 | −0.18 | 0.08 | Periodic |
| 3 | Contivo | 0.27 | 0.38 | 0.19 | Noisy |
| 4 | Esgui | 0.28 | −0.16 | −0.06 | Periodic |
| 5 | Parallax | 0.29 | −0.21 | 0.36 | Periodic, Spiky |
| 6 | Primavision | 0.14 | 0.18 | −0.78 | Spiky |
| 7 | Psghrms | 0.39 | −0.26 | −0.15 | Periodic |
| 8 | Pshd | 0.37 | −0.24 | −0.31 | Periodic, Spiky |

TABLE 2-continued

| Num. | App | f1 | f2 | f3 | Class |
|---|---|---|---|---|---|
| 9 | .Psportal | 0.23 | −0.34 | 0.05 | Noisy |
| 10 | Rdma | 0.22 | 0.51 | −0.05 | Noisy |
| 11 | Rocket | 0.23 | 0.21 | −0.03 | Noisy |
| 12 | Wwtbl | 0.28 | 0.40 | 0.17 | Periodic, Noisy |

The above classification helps to quickly understand the predominant behavior of a particular trace. It should be noted that the criteria used to attribute traces into classes can be modified based on particular design requirements.

Detrending Applications

Resource assignment is a useful technique for capacity planning. This method takes advantage of the seasonal complementarities of the periodic behavior of the traces and exploits any negative correlations between different applications' demand in a shared resource environment. It also considers the effect of unusual events, such as unexpected peaks. This capacity planning technique can also benefit from the structural analysis. It is possible to "detrend" application traces to examine one effect at a time. For example if one is interested in determining the seasonal behavior of the applications, the periodic behavior would be of most interest. Thus, the original application traces annulling the noisy and spiky components can be reconstructed. This will reconstruct a trace governed only by its periodic trend and, therefore, the analysis could be carried out more precisely. Sometimes, in analyzing the original trace directly it is difficult to distinguish and isolate only the effect of the periodicity.

Detrending includes removing one or more characteristics from a trace such as described above in order to concentrate on one or more effects at a time. For example, if a system operator is interested in determining when computer usage spikes occur, the operator may want to remove or "detrend" out of a computer utilization trace any "noise" features so that a better picture of the "spiky" computer usage behavior can be analyzed. The number of features such as "noisy" and "periodic" that are removed when performing the detrending can depend on such things as the number of features that are used to classify the traces as well as the differences between the features.

Analyzing the periodic trend alone, one can complement the valley of a period with a peak from another. For example, applications being utilized by users physically located on the East and West coasts, running in the same system, could differ in terms of utilization as a function of the hours of the day and therefore the load periodicity could be complemented in order to maximize resource utilization. On the other hand, to study anomalies and unexpected events in the system, one could be interested in separating the invisible spikes from the other effects. This can be done by considering only the third component in the reconstruction.

Figure 16:
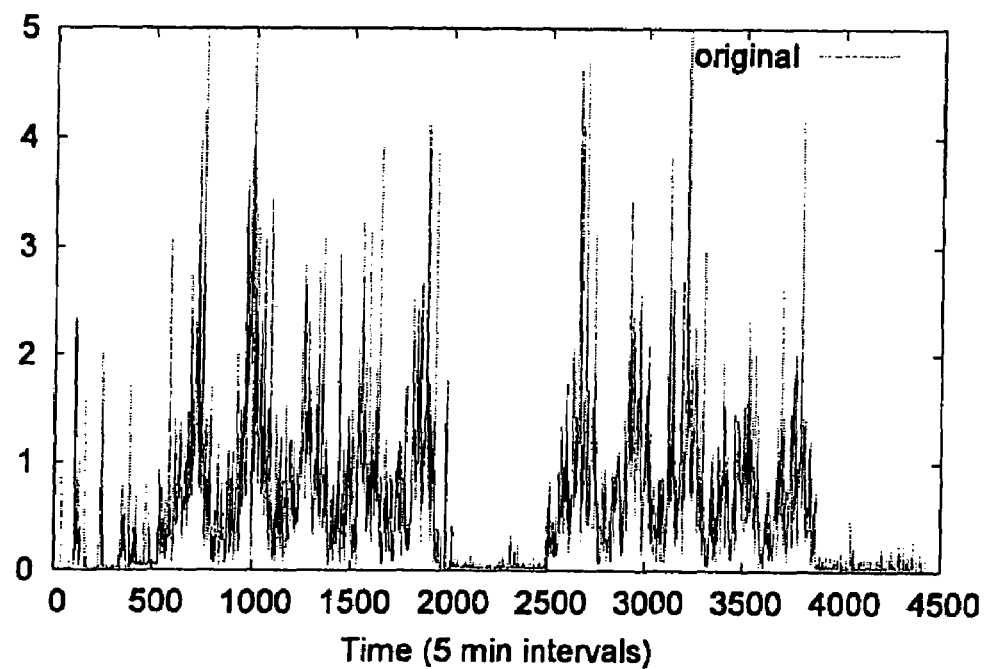
FIG. 16 shows a graph of an application that is to be detrended in accordance with an embodiment of the invention.
Figure 17:
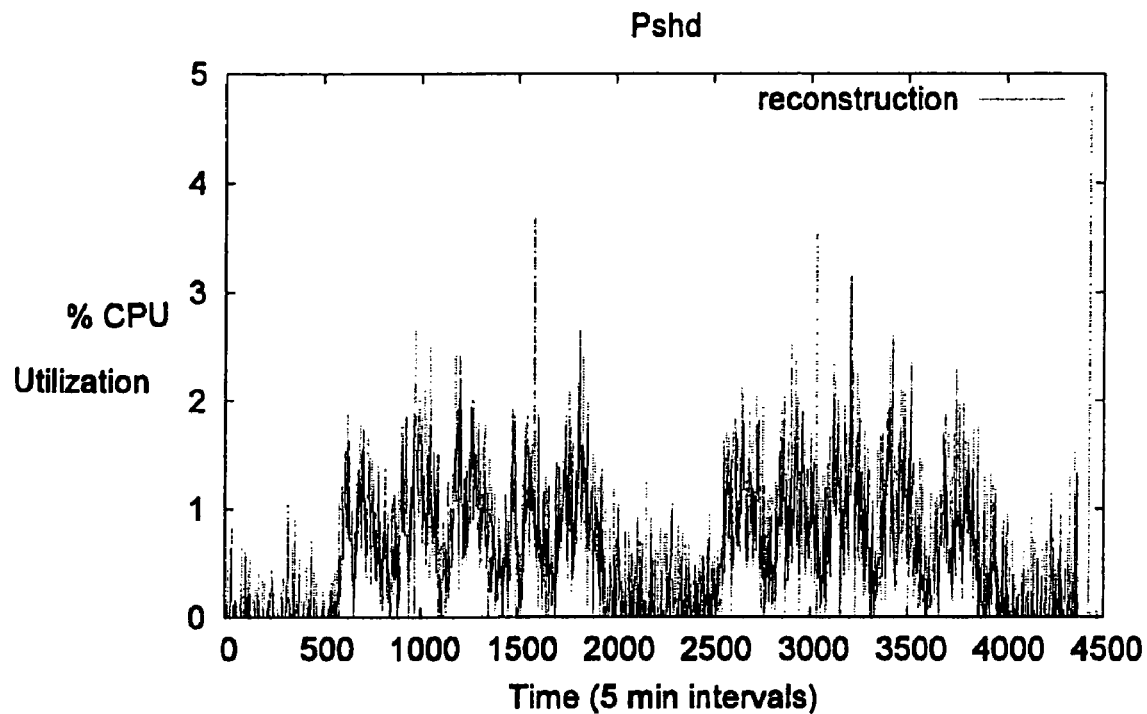
FIG. 17 shows a graph of one feature of a detrended application in accordance with an embodiment of the invention.
Figure 18:
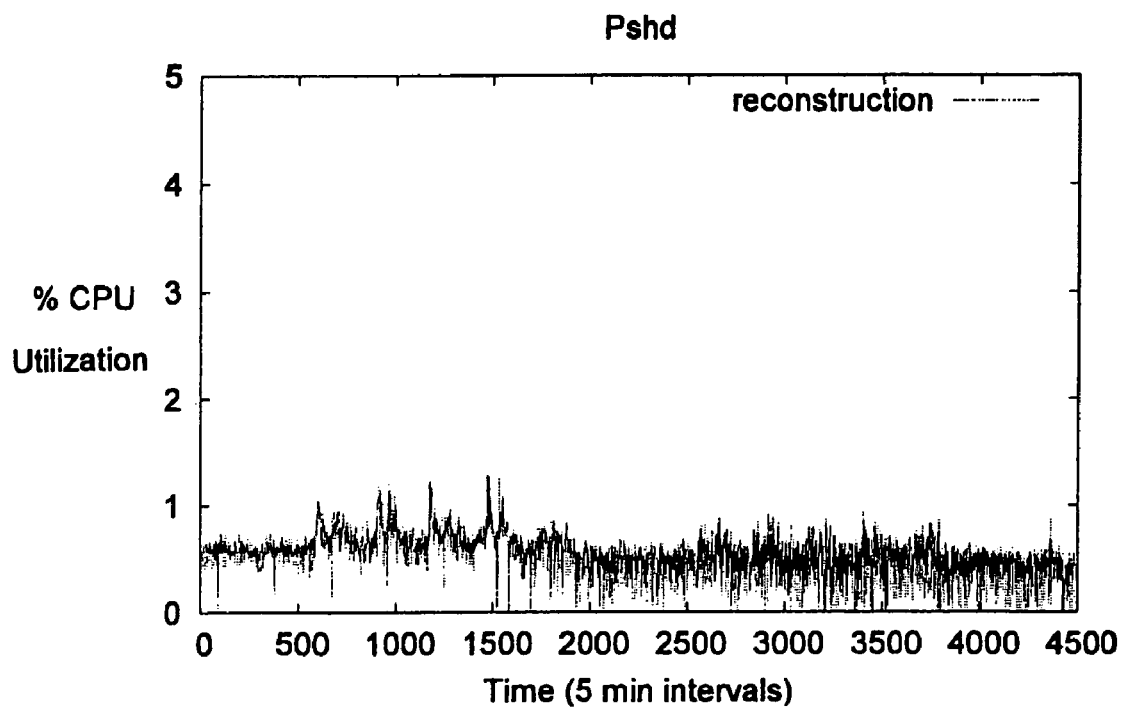
FIG. 18 shows a graph of a second feature of a detrended application in accordance with an embodiment of the invention.
Figure 19:
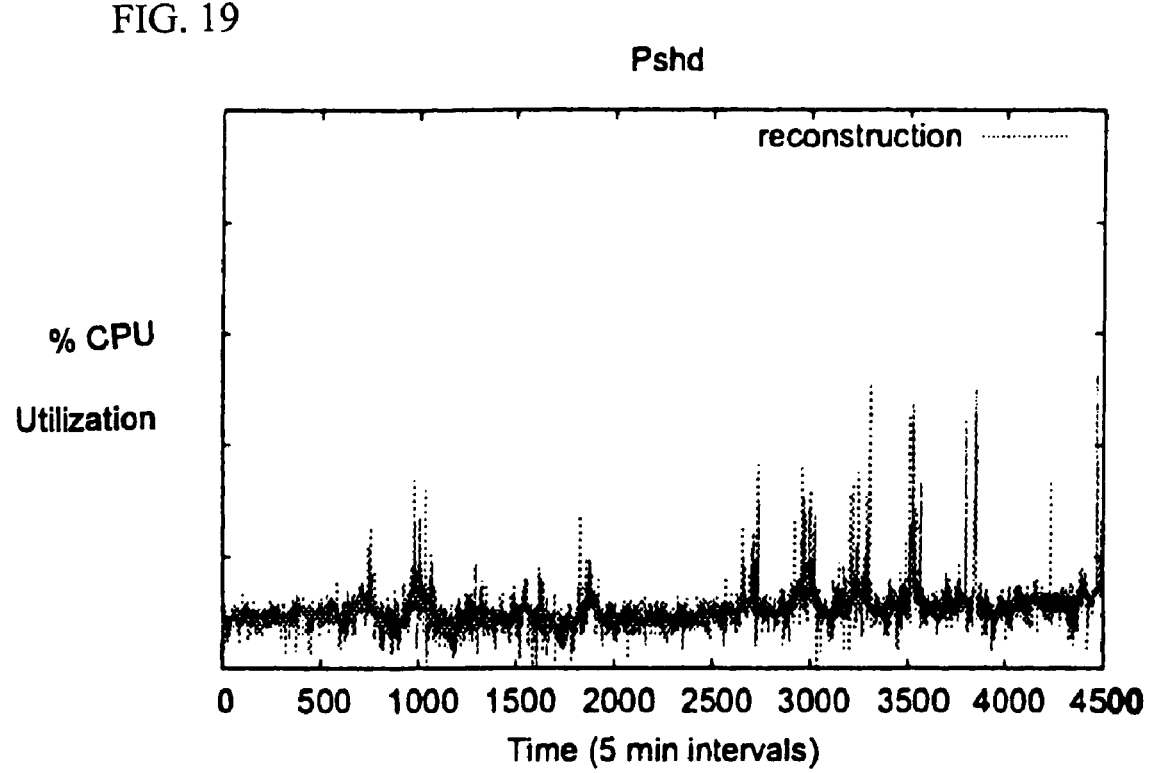
FIG. 19 shows a graph of a third feature of a detrended application in accordance with an embodiment of the invention.

As an illustration an actual application shown in FIG. 16 is detrended, presenting each effect, period, noise and spike, separately in FIGS. 17-19. It is interesting to see the intensity of the noise as shown in FIG. 18 and, also, the spikes shown in FIG. 19, which were indistinguishable when looking at the original trace shown in FIG. 16.

Generating Synthetic Workload

Synthetic workloads are useful for testing and simulation purposes in order to evaluate the effect of a new, slightly different application. As an example, one may want to simulate the behavior of a new application which is coupled to a headlines news database. This new application has the same noisy behavior as an existing one, lets say application y. However, due to a special unexpected event (e.g., news event), there is a peak during the business hours of some days. To evaluate the impact of this new application in the system, a synthetic trace from the y model is generated, intensifying the peak effect of application y. Doing so, the performance implications of the new application in the system due to the effect of "bursty" conditions incurred by the special news event can be evaluated. Similarly, it is also possible to suppress or undermine the presence of a feature in an application trace in order to reproduce some desirable behavior. The reconstruction of an original trace can be accomplished by:

$$U(V^{-1})_i = X_i^r. \qquad (3)$$

The synthetic trace generation is basically a reconstruction with a new combination of the basic features, that is, playing with the values of the inverted matrix $V^{-1}$. Equivalently, the equation mentioned previously can be written as:

$$U \begin{bmatrix} v_1 \\ v_2 \\ v_3 \end{bmatrix} = X_i^r. \qquad (4)$$

where $v_1$ is the parameter related to the periodic component, and $v_2$ and $v_3$ are related to the noisy and spiky components, respectively. As an illustration, application 2 has the following configuration:

$$U \begin{bmatrix} 0.37 \\ -0.18 \\ 0.08 \end{bmatrix} = X_2^r. \qquad (5)$$

Figure 20:
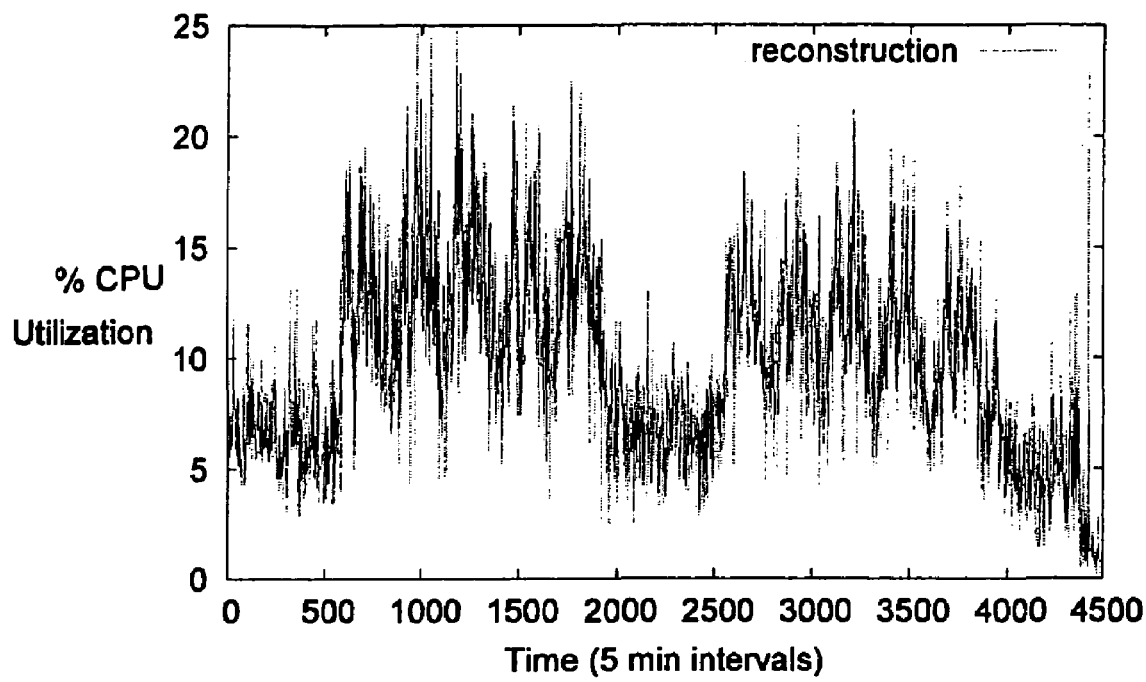
FIG. 20 shows of a graph of an application trace in accordance with an embodiment of the invention.
Figure 21:
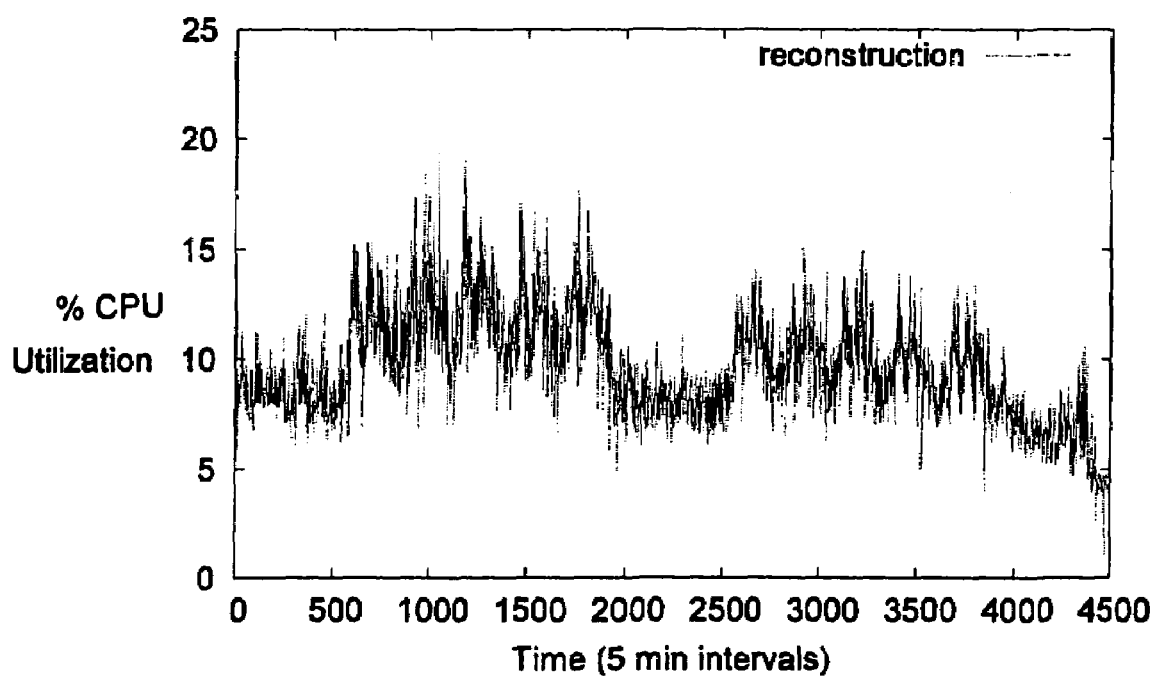
FIG. 21 shows a graph of a synthetic generated trace of the application trace shown in FIG. 20 in accordance with an embodiment of the invention.

If one wanted to reproduce the behavior of application 2 for example, but with half of the amplitude induced by the periodic feature. In order to produce this result, only half of the value in entry $v_1$ is attributed, that is $v_1$=0.18. The resulting trace can be seen in FIGS. 20 and 21. These figures compare the reconstruction of application 2 shown in FIG. 20, using the original configuration, to the new synthetic generated application shown in FIG. 21 that mimics its behavior but presents half of the periodic amplitude.

Outputs generated by the capacity planning method and apparatus in accordance with some embodiments of the invention include:

1) The principal feature(s) of one or more applications operating within a computational system. The features can be displayed graphically, or in tables, or in other formats for interpretation. Some features that can be provided include "periodic" which can include those applications exhibiting periodic cycles, "noisy" for applications that do not exhibit specific patterns or random patterns, and "spiky" for applications that exhibit occasional higher-than-normal peaks or valleys. Other feature characterizations can be provided depending on the particular capacity planning requirements. Different computational systems may have different feature sets that can provide for better interpretation.

2) The coefficient of each feature in an application trace can be provided. The coefficient of each feature representing the strength of the feature in a particular application trace.

3) A reconstructed trace for each application using a number one or more of the features, with the number of features selected to reconstruct a trace being selectable by a system operator.

4) The correlation of an original trace and a reconstructed trace for each application. The reconstructed trace being generated using a number of the features in an application trace. The correlation coefficient forming a number between 0 and 1 that represents the "goodness-of-fit" or resemblance of the reconstructed trace to the original. The number of features used for the reconstructed trace can be increased or decreased in order to achieve the correlation to the original trace desired.

5) Each application can be labeled based on the strength or weakness of each particular feature. If a particular feature reaches or exceeds a threshold, the feature may for example be characterized as prominent or weak. As an illustrative example, application A can be labeled predominantly feature 1, while feature 1 can be "Periodic."

6) A synthetic trace can be generated based on an existing application. A synthetic trace includes a reconstructed trace with one or more features amplified or suppressed. Synthetic traces are useful in analyzing traces using a controlled feature to see how they behave.

Although a few outputs have been discussed above, other outputs can be generated. Outputs can for example be outputted to a reporting system such as a web-based performance monitoring system, stand alone computer or integrated into a data collection system.

By extracting a small set of features common to the traces of all applications, the trace data can be processed fairly simultaneously, this allows for quick characterization of application behavior on resource consumption (e.g., CPU utilization). The method and apparatus described allows for the characterization of a system as a whole and does not require calibration or estimation of pre-defined parameters. A system operator can characterize the behavior of applications by representing the application traces using a small number of features that makes the classification easier to accomplish.

Using the classification, synthetic traces can be generated that allows an operator to simulate the behavior pattern of a new application and perform what-if scenarios on existing applications. The classification also helps system operators when they can add or remove computing resources from a computational system.

The above discussion is meant to be illustrative of the principles and various embodiments of the present invention. Numerous variations and modifications will become apparent to those skilled in the art. It is intended that the following claims be interpreted to embrace all such variations and modifications.

What is claimed is:

1. A method for computational analysis performed by at least one computer, comprising:
   collecting a resource utilization dataset by tracing resource utilization during simultaneous execution of a plurality of applications;
   determining an intrinsic dimensionality of the dataset; and
   extracting one or more features, corresponding to said intrinsic dimensionality, from the resource utilization dataset to generate a workload model; and
   using the workload model to reconstruct a resource utilization trace having all the features corresponding to said intrinsic dimensionality.

2. A method as defined in claim 1, wherein the extracting is performed using principal component analysis.

3. A method as defined in claim 1, wherein the resource utilization dataset collected includes central processor unit (CPU) utilization data.

4. A method as defined in claim 1, wherein the resource utilization dataset collected includes memory utilization data.

5. A method as defined in claim 1, wherein the resource utilization dataset collected is selected from disk usage data and device I/O usage data.

6. A method as defined in claim 1, further comprising:
performing dimensionality analysis on the resource utilization dataset to determine which features to extract to generate the workload model.

7. A method as defined in claim 1, further comprising using the workload model to classify the plurality of applications into groups, where each group has a different dominant feature corresponding to one of said plurality of features.

8. A method as defined in claim 1, further comprising:
using the workload model to reconstruct a detrended application trace with at least one of the features corresponding to said intrinsic dimensionality being removed.

9. A method as defined in claim 1, further comprising:
using the workload model to reconstruct a synthesized application trace with at least one of the features corresponding to said intrinsic dimensionality being suppressed or amplified.

10. A method as defined in claim 1, wherein the resource utilization dataset collected comprises network bandwidth usage data.

11. A computer-readable storage medium storing instructions executable by a processor, the instructions cause the processor to:
determine an intrinsic dimensionality of a resource utilization trace dataset associated with simultaneous execution of a plurality of applications;
build a workload model having a plurality of features corresponding to said intrinsic dimensionality; and
use the workload model to reconstruct a resource utilization trace having all the features corresponding to said intrinsic dimensionality.

12. The computer-readable storage medium of claim 11 wherein the processor determines the intrinsic dimensionality by applying principal component analysis (PCA) to the resource utilization trace dataset.

13. The computer-readable storage medium of claim 11 wherein the instructions further cause the processor to use the workload model to classify the plurality of applications into groups, where each group has a different dominant feature corresponding to one of said plurality of features.

14. The computer-readable storage medium of claim 11 wherein the instructions further cause the processor to reconstruct a synthesized application trace with at least one of the features corresponding to said intrinsic dimensionality being suppressed.

15. The computer-readable storage medium of claim 11 wherein the instructions further cause the processor to reconstruct a synthesized application trace with at least one of the features corresponding to said intrinsic dimensionality being amplified.

16. The computer-readable storage medium of claim 15 wherein the instructions further cause the processor to reconstruct a detrended application trace with at least one of the features corresponding to said intrinsic dimensionality being removed.

* * * * *

UNITED STATES PATENT AND TRADEMARK OFFICE
CERTIFICATE OF CORRECTION

PATENT NO. : 7,698,111 B2  Page 1 of 1
APPLICATION NO. : 11/076131
DATED : April 13, 2010
INVENTOR(S) : Bruno Abrahao et al.

It is certified that error appears in the above-identified patent and that said Letters Patent is hereby corrected as shown below:

In column 5, line 6, after "variation" insert -- in --.

In column 11, line 14, in Claim 7, delete "claim 1," and insert -- claim 1 --, therefor.

In column 12, line 28, in Claim 16, delete "claim 15" and insert -- claim 11 --, therefor.

Signed and Sealed this

Tenth Day of August, 2010

David J. Kappos
*Director of the United States Patent and Trademark Office*